(12) United States Patent
Susaki et al.

(10) Patent No.: US 6,327,658 B1
(45) Date of Patent: Dec. 4, 2001

(54) DISTRIBUTED OBJECT SYSTEM AND SERVICE SUPPLY METHOD THEREIN

(75) Inventors: Seiichi Susaki, Yokohama; Katsuyuki Umezawa, Hino; Tadashi Kaji, Fujisawa; Satoru Tezuka, Yokohama; Ryoichi Sasaki, Fujisawa; Kuniaki Tabata, Tokyo; Takashi Akaosugi, Machida; Akira Kito, Fujisawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/185,644

(22) Filed: Nov. 4, 1998

(30) Foreign Application Priority Data

May 11, 1997 (JP) .................................. 09-302805

(51) Int. Cl.[7] ..................................... H04L 9/32

(52) U.S. Cl. ........................ 713/176; 705/51; 713/200

(58) Field of Search ..................... 713/167, 176, 713/188–189, 201, 200; 705/51

(56) References Cited

U.S. PATENT DOCUMENTS

| | | | | |
|---|---|---|---|---|
| 4,919,545 | * | 4/1990 | Yu .......................................... | 380/25 |
| 5,005,200 | * | 4/1991 | Fisher .................................... | 380/30 |
| 5,301,316 | * | 4/1994 | Hamilton et al. ..................... | 395/600 |
| 5,341,429 | * | 8/1994 | Stringer et al. ....................... | 380/23 |
| 5,367,573 | * | 11/1994 | Quimby ................................ | 380/25 |
| 5,748,960 | * | 5/1998 | Fisher .................................... | 395/683 |
| 5,818,936 | * | 10/1998 | Mashayekhi ......................... | 380/25 |
| 5,850,449 | * | 12/1998 | McManis ............................... | 380/25 |
| 6,035,402 | * | 3/2000 | Vaeth et al. .......................... | 713/201 |
| 6,078,995 | * | 6/2000 | Konno et al. ......................... | 709/224 |

OTHER PUBLICATIONS

S. Oaks, "Java Security", O'Reilly & Associates, Inc., May 1998 (Cover, Publishing Page & 1st page of table of contents).
R. Orfali, et al, "Instant COBRA", John Wiley & Sons, Inc., 1997 (Cover, Publishing Page, Forward, Java Series Page).
R. Orfali, et al. "Client/Server Programming with Java and CORBA", John Wiley & Sons, Inc., 1998.(Front & Back Covers & The Publishing Page).

* cited by examiner

Primary Examiner—Gilberto Barron, Jr.
Assistant Examiner—Kambiz Zand
(74) Attorney, Agent, or Firm—Antonelli, Terry, Stout & Kraus, LLP

(57) ABSTRACT

A distributed object system comprising at least one object distributing server, at least one client terminal and at least one server object execution server according to the present invention, including: an object distributing server for storing an object program to which an electronic signature is affixed; a client terminal including means for down-loading the object program from the object distributing server, means for verifying the electronic signature affixed to the object program, means for executing the client object program when the completeness of the object program is confirmed and the user of the client terminal beforehand permits execution of the client object program which is electronically signed by a signatory, and means for transmitting the electronic signature affixed to the object program to a server object execution server; and a server object execution server including means for verifying the signature received, and means for supplying services to the user of the client terminal when the completeness of the object program is confirmed and the user and the object program permit use of the services in advance, which makes it possible to prevent a client object which is down-loaded to a client terminal through a network and executed therein from carrying out unjustified processing (not intended by a user using the client terminal) by using authority of the user.

10 Claims, 17 Drawing Sheets

FIG.2A
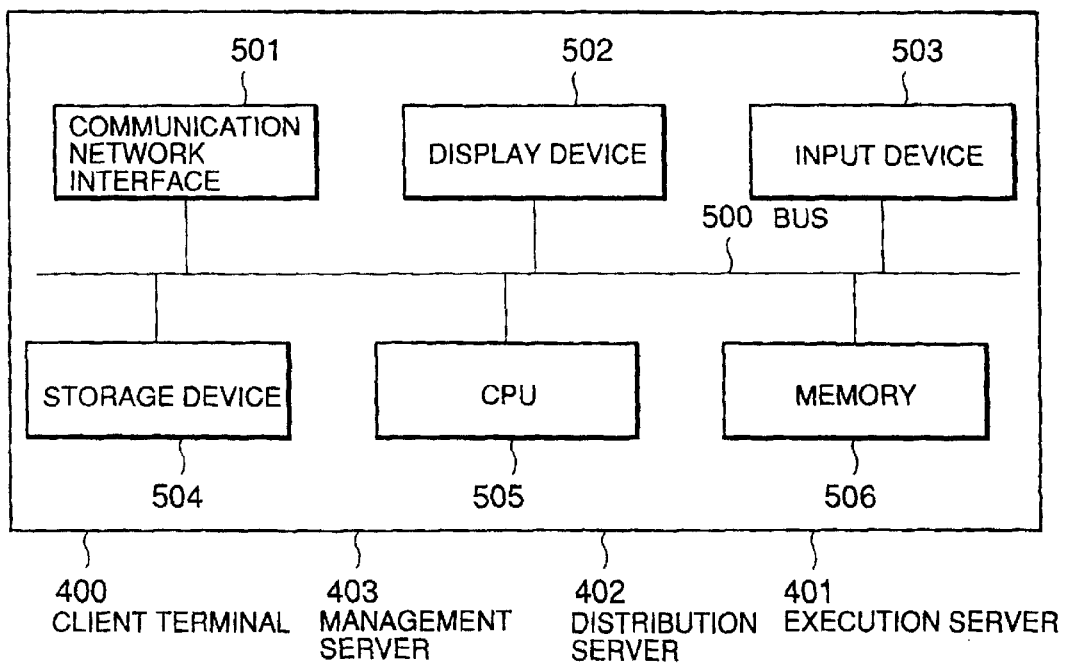
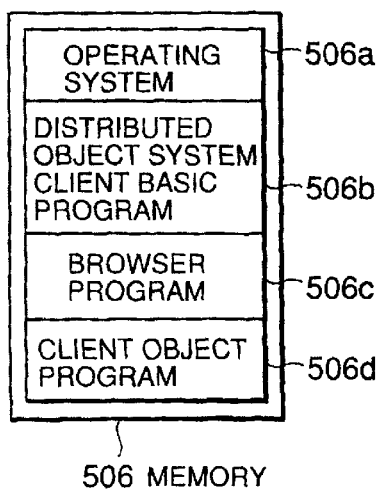
FIG.2B
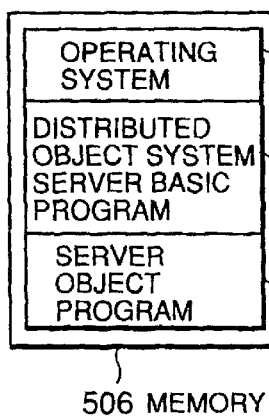
FIG.2C
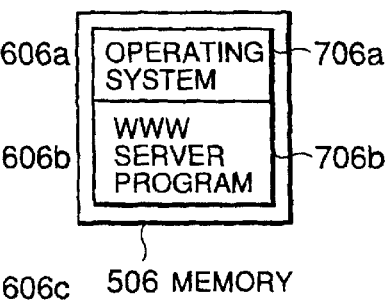
FIG.2D
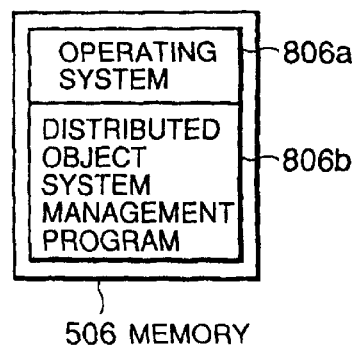
FIG.2E

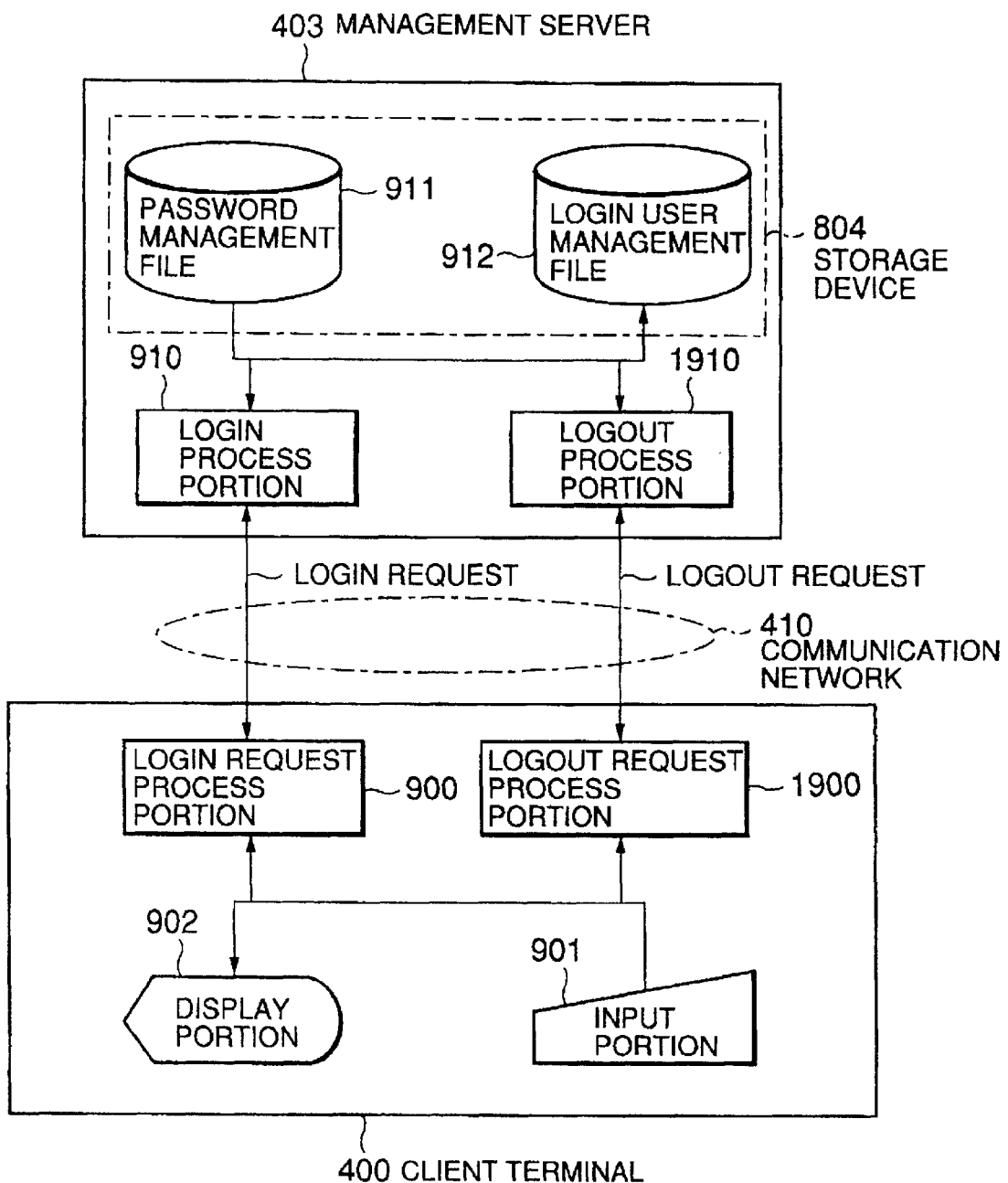

FIG.4

PASSWORD MANAGEMENT FILE

911

| USER IDENTIFIER | PASSWORD | PRIVILEGE |
|---|---|---|
| TARO | LAVFA5SI | PRIVILEGE 4 |
| JIRO | GKDSK60G | PRIVILEGE 1 |
| HANAKO | P5JYR73I | PRIVILEGE 1 |
| ⋮ | ⋮ | ⋮ |

FIG.5

LOGIN USER MANAGEMENT FILE

912

| USER IDENTIFIER | POSITION INFORMATION | PRIVILEGE |
|---|---|---|
| HANAKO | TERMINAL 4 | PRIVILEGE 1 |
| AKIKO | TARMINAL 11 | PRIVILEGE 7 |
| GORO | TERMINAL 2 | PRIVILEGE 2 |
| ⋮ | ⋮ | ⋮ |

FIG.7

SERVER OBJECT MANAGEMENT FILE

1211

| OBJECT IDENTIFIER | POSITION INFORMATION | START STATE |
|---|---|---|
| S-OBJECT 1 | SERVER 1 | START |
| S-OBJECT 2 | SERVER 5 | START |
| S-OBJECT 3 | SERVER 2 | NON-START |
| ⋮ | ⋮ | ⋮ |

FIG.9

| | SIGNATURE OBJECT MANAGEMENT FILE 1402 | CLIENT OBJECT MANAGEMENT FILE 1625 |
|---|---|---|
| | OBJECT IDENTIFIER | NAME OF OBJECT CREATOR |
| | C-OBJECT 1 | TARO |
| | C-OBJECT 2 | HIROSHI |
| | C-OBJECT 3 | TARO |
| | ⋮ | ⋮ |

FIG.11

ACCESS MANAGEMENT FILE

1624

| OBJECT IDENTIFIER | USER OR PRIVILEGE | AUTHORITY FOR USE |
|---|---|---|
| S-OBJECT 1 | TARO | UNAUTHORIZED |
| | JIRO | AUTHORIZED |
| | ⋮ | ⋮ |
| | PRIVILEGE 1 | AUTHORIZED |
| | PRIVILEGE 2 | AUTHORIZED |
| | ⋮ | ⋮ |
| ⋮ | ⋮ | ⋮ |

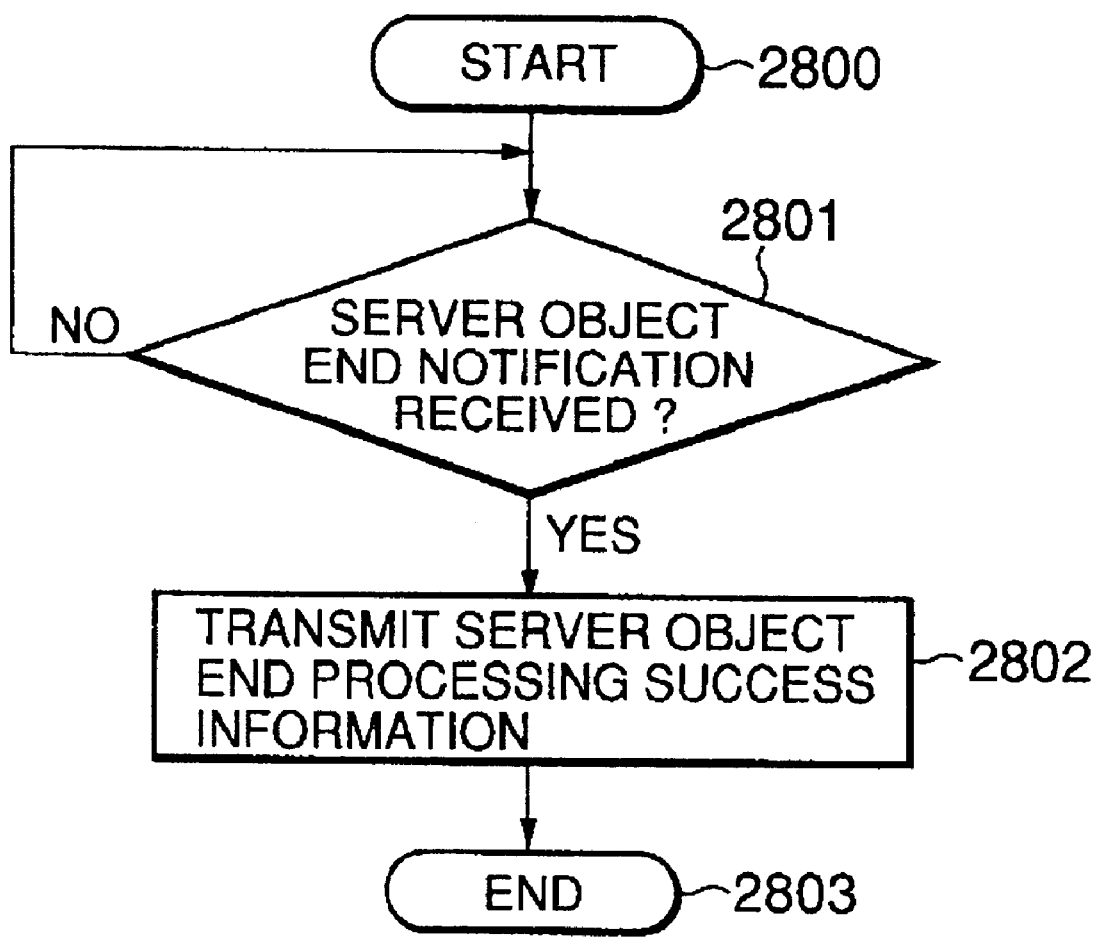

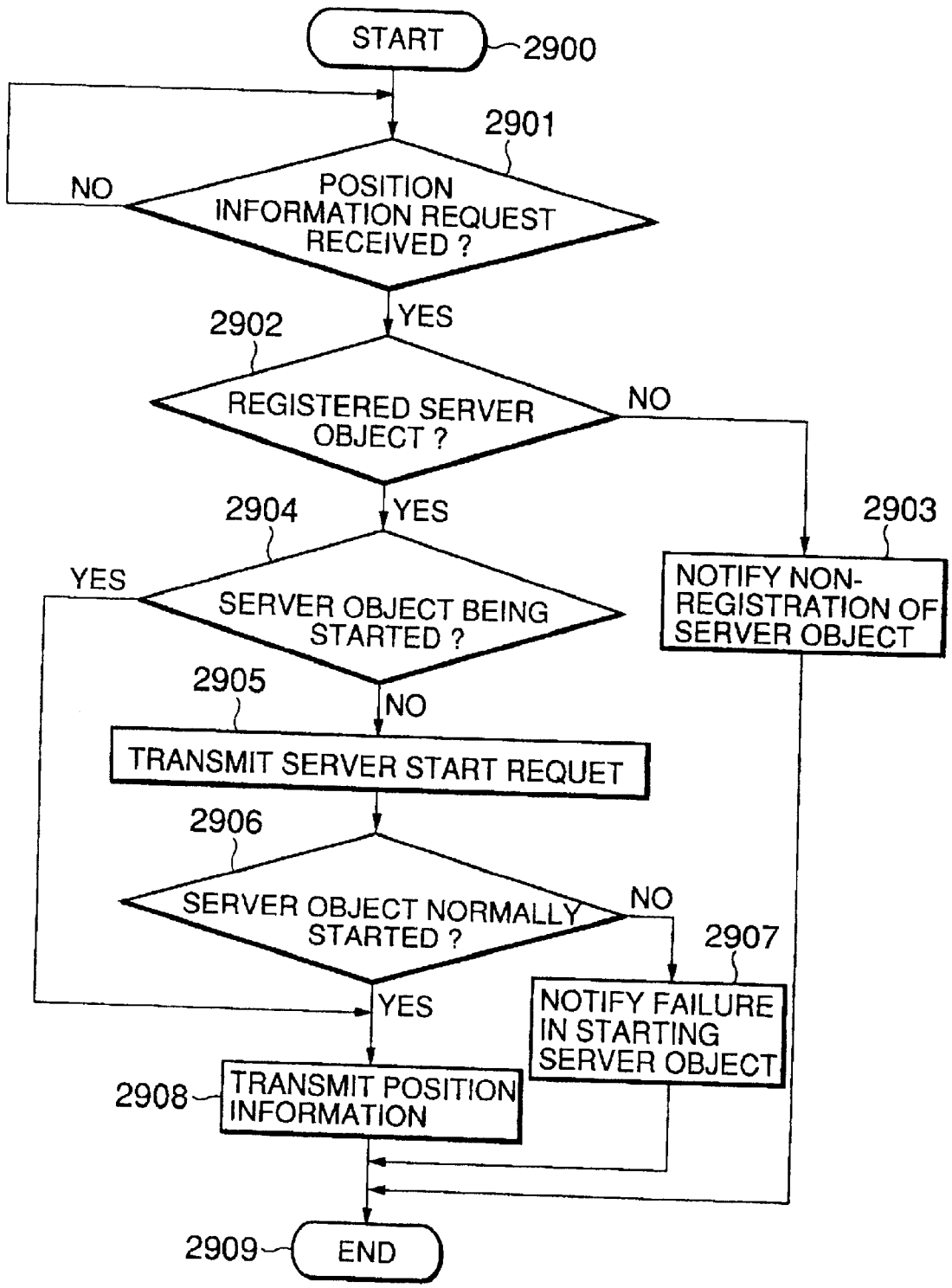

DISTRIBUTED OBJECT SYSTEM AND SERVICE SUPPLY METHOD THEREIN

BACKGROUND OF THE INVENTION

1. Field of the Invention

The present invention relates to security in a distributed object system comprising one or plural server objects for supplying various services, and one or plural client objects for using these services.

2. Description of the Related Art

A distributed object system which is established by combining a client server system (distributed computing system) and an object oriented technique are starting to attract a lot of attention.

Unlike the client server system (distributed computing system), in the distributed object system, a client application (client object) is not required to beforehand know where a server program (server object) operates. Further, even in a case where the system is expanded, no change is required at a client side. Therefore, a highly flexible system can be built up.

The flexibility and mechanism of the distributed object system as described above is described in "Client/Server Programming With Java and CORBA" written by Robert Orfali, Dan Harkey and published by John Wiley & Sons, for example.

In practice, there are many cases that all the communications between an client object and a server object are frequently performed via an object intermediate program, whereby establishment of a highly flexible distributed object system can be performed.

In order to build up such a flexible system, activities for standardization on the distributed object system have been recently carried out. The above publication briefly describes the activities for standardization.

In the information processing field, much attention has been paid to a software component technique for fabricating software such as applications, data used by the applications, etc. as components.

This technique has a lot of merits. For example, a component serving as a basic portion of an application is pre-installed in a client terminal, and when the application is started, the client terminal is first connected to an indicated server through a network to download an additive component which completes the application in combination with the basic portion of the application, and then it actually executes the application. As a result, the same client component can be used for various processing by merely preparing components which are different among servers, so that the development efficiency of the system is enhanced.

With the development and propagation of the information processing technique as described above, requirements for a security technique for authorization, access control, enciphering of information, etc. have been increasing more than ever.

The security function of the distributed object technique is described in "Instant CORBA" written by Robert Orfali, Dan Harkey, Jeri Edwards and published by John Wiley & Sons, for example. According to this publication, it is specified that the following six security functions are supplied as common services in the standardization activities of the distributed object system as described above.

(1) An identification function of checking the identity of a principal such as a user, an object or the like. The principal identifies itself by exhibiting secret information (password or the like) known only by itself and a server which performs authentication.

(2) An access control function of checking whether a principal whose identity is authenticated has authority to access resources such as objects, etc., and controlling the access.

(3) A security auditing function of recording various events relating to security.

(4) A communication protection function of protecting communications between a client object and a server object from a third party. This function contains a function of detecting tampering or breakdown of data, and a function of preventing data from being tapped.

(5) A non-repudiation function of verifying the fact of transmission/reception of data between a client and a server so that both the client and the server are disabled to afterwards deny that they performed the transmission/reception of the data.

(6) An operation management function of setting the security policy, etc. by a manager.

The security function of the software component technique is described in "Java Security" written by Scott Oaks and published by O'Reilly & Associates, Inc., for example. According to this publication, the following restrictions are imposed on the client components which are down-loaded through a network.

(1) A down-loaded client component cannot access any local resource (file, device, etc.) at a client terminal.

(2) A down-loaded client component can only communicate with a server in which the component has been kept.

(3) A down-loaded client component cannot create any new process.

Such security functions have been proposed to protect the system from a hostile client component. However, it is apparent from these restrictions that they lose the merits of the software component technique. Therefore, the following extension function has been also proposed That is, a client component down-loaded through a network is beforehand added with a signature of a creator who created the component (the signature is electronically made, and thus it is known as a "digital signature"), and when a user using a client terminal agrees that if it is a creator's client component, the client component is trusted, the above restrictions are excluded from the client component.

SUMMARY OF THE INVENTION

Both the distributed object technique and the software component technique are based on an object oriented technique. Therefore, there is such a movement that client objects, server objects and object intermediating programs are built up as components.

If the above two techniques are used in cooperation with each other, the following characteristics will be achieved.

(1) A client object is not required to recognize a server in which a server object operates, and it can use the same service irrespective of the server in which the server object operates.

(2) A client object which is not beforehand installed in a client terminal, but down-loaded from a server via a network can be automatically executed at that place.

In the case of the system in which the distributed object technique and the component technique are used in cooperation with each other, the following problems occur if the system has merely the above security functions which are independent from one another.

Assume that an unauthorized person U1 tries to unjustly copy a file F1 which is under the management of a server S1 (in which a server object OS1 operates) and to which no access can be made with the privilege of the unauthorized person Ul. The unauthorized person U1 generates a client object OC1 which is a signed object and which accesses the server object OS1 for unjustly copying a file F1 and then transmits the copy to the unauthorized person U1. The unauthorized person U1 keeps the client object OC1 and other signed object OC2, OC3 (in which no unjustified processing is installed) in a WWW server S2 managed by the unauthorized person U1 in such a state that these client object can be down-loaded.

Further, assume that a user U2 having authorization to access the file F1 down-loads the signed client object OC1 from a client terminal C1 by using a browser program. If the user U2 has experience of previously down-loading the client objects OC2, OC3 and sets them so as to give credit to the client object with the signature created by the user U1 at any time or at the time when the user U2 down-loads OC1, the signed client object OC1 starts to operate on the basis of the privilege of the user U2 (not the privilege of the unauthorized person U1).

As a result, the unauthorized person U1 can unjustly gain the file F1 to which access should not be possible by using the privilege thereof. Further, when the signed client object OC1 is set so as to apparently perform the same operation as the normal signed client object OC2 or OC3, the user U2 may be unaware that the signed client object OC1 carries out unjustified processing.

Further, the Browser program may automatically download OC1 although the user U2 does not know it, and in this case the user U2 is also usually unaware of the unjustified processing of OC1.

As described above, the security function of the conventional distributed object technique and the security function of the software component technique cannot completely prevent such an unjustified action as described above without losing the characteristics (1) and (2) of the system in which the above two techniques are used in cooperation with each other.

The present invention has been implemented in view of the above situation, and has an object to provide: a method of preventing a client object down-loaded to a client terminal via a network and then executed therein from performing, with the privilege of a user using the client terminal, unjustified processing which is not intended by the user; a distributed object system using the method; a client terminal, a server object execution server, a client object distribution server, and a distributed object system management server which are used in the distributed object system; and programs for implementing the above system.

In the distributed object system of the present invention, all client object programs are added with electronic signatures.

When a user of a client terminal down-loads a client object program from a client object distribution server, the electronic signature of the client object program is verified before the client object program concerned is executed. Further, only when the completeness of the client object program is confirmed and the user of the client terminal permits execution of the client object program signed by a signatory, is the client object program executed.

Further, when the user of the client terminal uses services supplied from a server object execution server by using the client object program, the client terminal transmits the electronic signature affixed to a client object program when a service is requested. The server object execution server which receives the signature verifies the signature concerned before it supplies the service to the user of the client terminal. In this case, only when the completeness of the client object program is confirmed and both the user concerned and the client object program concerned are beforehand permitted to use the service concerned by the manager of the server object execution server, is the service supplied to the user of the client terminal.

Accordingly, according to the present invention, a client object program which is down-loaded to a client terminal via a network and executed therein can be prevented from performing, with the privilege of a user using the client terminal, unjustified processing which is not intended by the user.

BRIEF DESCRIPTION OF THE DRAWINGS

FIGS. 2A to 2E are diagrams showing the hardware construction of a client terminal, an executing server, a distributing server and a management server shown in FIG. 1;

FIG. 3 is a functional block diagram showing a client terminal and a management server which are associated with login processing and logout processing of a user;

FIG. 4 is a diagram showing an example of information stored in a password management file shown in FIG. 3;

FIG. 5 is a diagram showing an example of information stored in a login user management file shown in FIG. 3;

FIG. 7 is a diagram showing an example of information stored in a server object management file shown in FIG. 6;

FIG. 9 is a diagram showing an example of information stored in a signature object management file shown in FIG. 8 and a client object management file shown in FIG. 10;

FIG. 11 is a diagram showing an example of information stored in an access management server shown in FIG. 10;

FIG. 19 is a flowchart showing the operation of the management server associated with the ending processing of the server object program according to the present invention; and FIG. 20 is a flowchart showing the operation of the management server associated with a position information request from the user according to the present invention.

DETAILED DESCRIPTION OF THE PREFERRED EMBODIMENT

A preferred embodiment according to the present invention will be described hereunder with reference to the accompanying drawings. The present invention is not limited to the following embodiment, and various modifications may be made.

Figure 1:
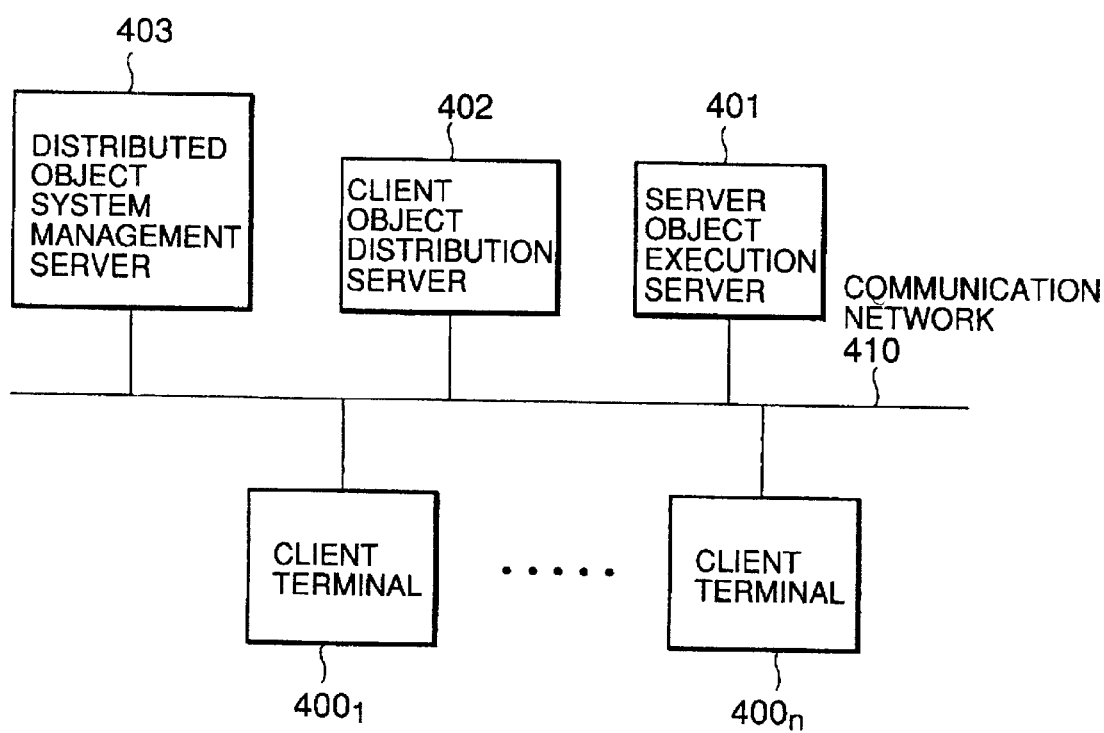
FIG. 1 is a block diagram showing the equipment construction of a distributed object system to which an embodiment of the present invention is applied.

FIG. 1 is a diagram showing the equipment construction of a distributed object system to which an embodiment of the present invention is applied.

As shown in FIG. 1, the distributed object system according to this embodiment includes client terminals $400_1$ to $400_n$ (hereinafter referred to simply as "client terminal 400"), a server object execution server 401 (hereinafter referred to as "executing server 401"), a client object distribution server 402 (hereinafter referred to as "distributing server 402"), and a distributed object system management server 403 (hereinafter referred to as "management server 403") which are connected to one another through a communication network 410 such as a LAN or the like.

The executing server 401 supplies various services to the client terminal 400. Here, the word "service" means that the client terminal 400 is allowed to practically use resources owned by the executing server 401. A user can be supplied with various services which are to be supplied from the executing server 401.

The distributing server 402 is a so-called WWW server, and it transmits a client object program as described later when an access based on a Browser program is made from the client terminal 400. The client object program thus transmitted is executed in the client terminal 400, and practically used to use the services which the executing server 401 supplies.

The management server 403 manages the overall distributed object system shown in FIG. 1. More specifically, it performs positional management between the client terminal 400 and the executing server 401 (the management of a network address, etc.), status management (the management of an operation state, a usage status, etc. ), security management (the management of users using the client terminal 400, etc.), etc.

Next, the hardware construction of a computer used in the client terminal 400, the executing server 401, the distributing server 402 and the management server 403 will be described with reference to FIG. 2.

As shown in FIG. 2A, the computer includes a communication network interface 501, a display device 502, an input device 503, a storage device 504, a central processing unit (CPU) 505 and a memory 506 which are mutually connected to one another through a bus 500.

The communication network interface 501 is an interface for communicating data with another terminal such as a server through the network 410. The display device 502 is used to display various messages for the user, and it comprises a CRT, a liquid crystal display device or the like. The input device 503 is used to input various data, commands, etc. by the user, and it comprises a keyboard, a mouse or the like. The storage device 504 is used to permanently store programs and data used in each computer, and it comprises a hard disk, a floppy disk or the like. The CPU 505 serves to collectively control the respective parts constituting each computer and perform various calculation processing. In the memory 506 are temporarily stored an operating system 506a (hereinafter referred to as "OS 506a"), programs for implementing each terminal, server. Here, OS 506a is a program for implementing various functions such as file management, process management and device management in order to control the overall client terminal 400.

The computer which implements each terminal and server is not necessarily required to have the same construction as described above, and it may be constructed in order to meet its use purpose.

When a computer is constructed as the client terminal 400, programs executed by the CPU 505 such as a distributed object system client basic program 506b (hereinafter referred to simply as "client basic program 506b"), a browser program 506c and a client object program 506d are temporarily stored in the memory 506 as shown in FIG. 2B.

The client basic program 506b serves to make the client terminal 400 operate as a client in the distributed object system. The client basic program 506b performs various processing in cooperation with a distributed object system server basic program and a distributed object system management program as described later.

The browser program 506c is a program for allowing the client terminal 400 to communicate with the distributing server 402 and down-load the client object program 506d.

The client object program 506d is a program for performing processing needed to use the various services supplied from the executing server 401. More specifically, the user of the client terminal 400 performs the processing required when using the services. The client object program 506d contains an object identifier for discriminating the client object program 506d from the other programs, the signature of a creator of the client object program 506d concerned (in this embodiment, all data required to verify the signature of the creator are referred to as "signature"), etc., and thus it is available to identify the creator concerned and check the completeness of the client object program 506d (check whether the program has been tampered with).

When a computer is constructed as the executing server 401, in the memory 506 there are temporarily stored programs executed by the CPU 505 such as OS 606a, a distributed object system server basic program 606b (hereinafter referred to simply as "server basic program 606b") and a server object program 606c as shown in FIG. 2C. Here, OS 606a is a program for implementing functions such as file management, process management and device management in order to control the overall executing server 401.

The server basic program 606b is a program for making the executing server 401 operate as a server in the distributed object system. The server basic program 606b performs various processing in cooperation with the above client basic program 506b and a distributed object system management program described later.

The server object program 606c serves to supply various services to the client terminal 400 concerned in accordance with a service supply request from the client terminal 400. More specifically, in cooperation with the client object program 506*d*, the server object program 606*c* performs processing needed when the user of the client terminal 400 uses the services. The server object program 606*c* contains an object identifier for discriminating the server object program 606*c* from the other programs.

When a computer is constructed as the distributing server 402, as shown in FIG. 2D, programs executed by the CPU 505, such as OS 706*a* and a WWW server program 706*b*, are temporarily stored in the memory 506. Here, OS 706*a* is a program for implementing functions such as a file management, a process management and a device management in order to control the overall distributing server 402.

The WWW server program 706*b* transmits data stored in the storage device 504 (the above client object program 506*d* or the like) when an access based on the Browser program 506*c* is made from the client terminal 400.

When a computer is constructed as the management server 403, as shown in FIG. 2E, programs executed by CPU 505 such as OS 806*a* and a distributed object system management program 806*b* (hereinafter referred to merely as "system management program 806*b*"), are temporarily stored in the memory 506. Here, OS 806*a* is a program for implementing functions such as file management, process management and device management in order to control the overall management server 403.

The system management program 806*b* is a program for properly managing the overall distributed object system of this embodiment. The system management program 806*b* performs various processing in cooperation with the client basic program 506*b* and the server basic program 606 described above.

The functional block construction of the client terminal 400, the executing server 401, the distributing server 402 and the management server 403 which constitute the distributed object system according to this embodiment will be described with reference to the accompanying drawings.

FIG. 3 is a functional block diagram showing the client terminal 400 and the management server 403 when the user of the client terminal 400 starts/finishes the use of the distributed object system according to this embodiment. Here, each functional block of the client terminal 400 is implemented through the execution of each program stored in the memory 506 by the CPU 505 of the client terminal 400. Further, each functional block of the management server 403 is implemented through the execution of each program stored in the memory 506 by the CPU 505 of the management server 403.

The functional block construction of the client terminal 400 will now be described.

As shown in FIG. 3, the client terminal 400 has an input portion 901 for accepting instructions from the user of the client terminal 400, a display portion 902 for displaying data input to the input portion 901 and data transmitted from the management server 403 or the like, a login request process portion 900 for making a login request to the management server 403 in accordance with the instruction from the user which is input to the input portion 901, and a logout request process portion 1900.

The functional block construction of the management server 403 will now be described.

As shown in FIG. 3, the management server 403 includes a login process portion 910 for performing login processing in accordance with a login request from the client terminal 400, and a logout process portion 1910.

Figure 6:
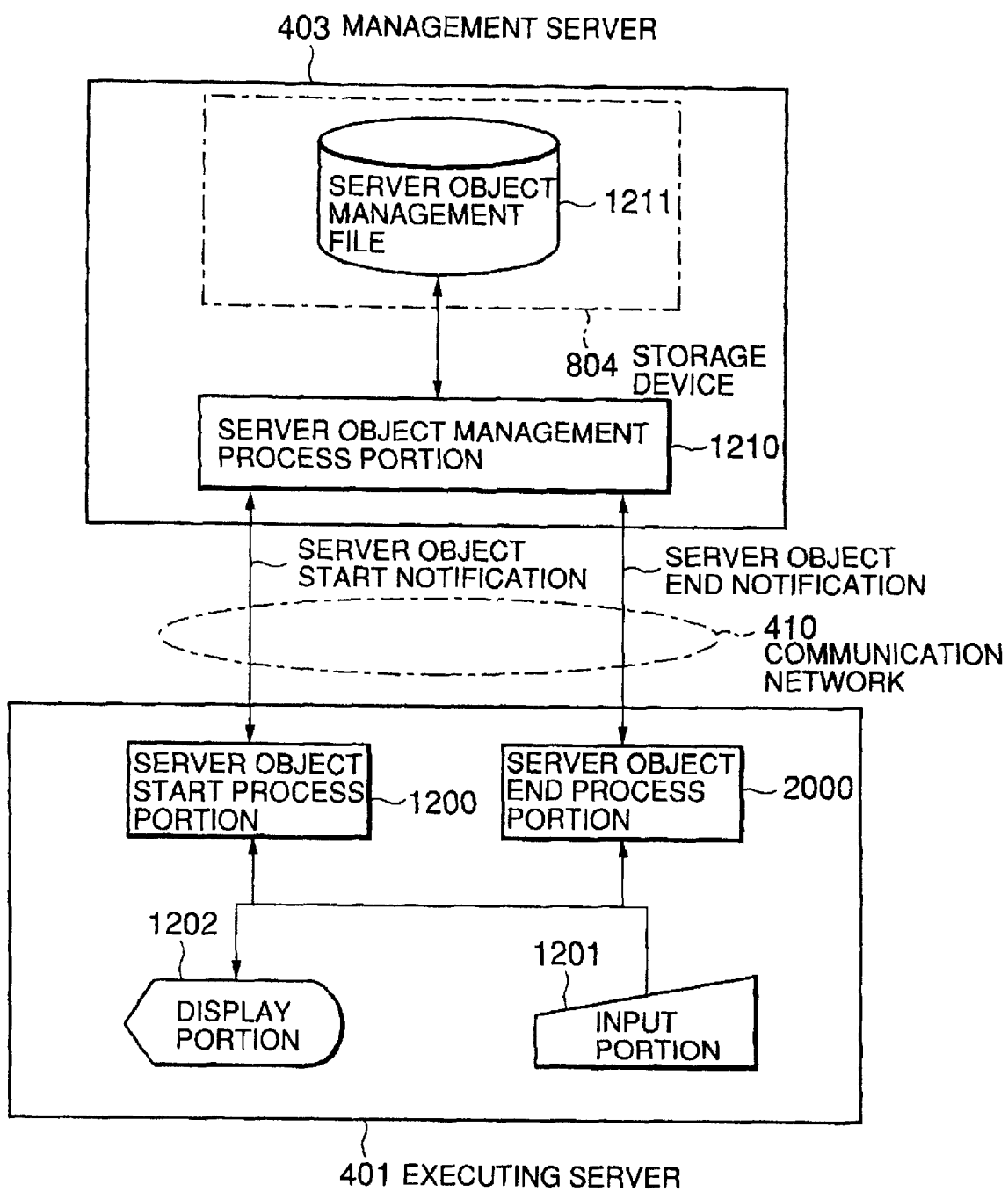
FIG. 6 is a functional block diagram showing an executing server and a management server which are associated with server object program starting and finishing processing of a server object program of the present invention.

FIG. 6 is a functional block diagram showing the executing server 401 and the management server 403 when the manager of the executing server 401 starts/finishes the server object program 606*c*. Here, each functional block of the executing server 401 is implemented through the execution of each of the programs stored in the memory 506 by the CPU 505 of the executing server 401. Further, each functional block of the management server 403 is implemented by the execution of each of the programs stored in the memory 506 by the CPU 505 of the management serer 403.

Next, the functional block construction of the executing server 401 will be described.

As shown in FIG. 6, the executing server 401 includes an input portion 1201 for accepting an instruction from the manager of the executing server 401, a display portion 1202 for displaying data input to the input portion 1201 and data transmitted from the management server 403, a server object starting process portion 1200 for notifying the management server 403 to start a server object in accordance with the instruction of the user which is input to the input portion 1201, and a server object ending process portion 2000 for notifying the end of the server object to the management server 403.

The functional block construction of the management server 403 will now be described.

As shown in FIG. 6, the management server 403 has a server object management process portion 1210 for renewing a server object management file 1211 in accordance with a server object starting notification or a server object ending notification from the executing server 401.

Figure 8:
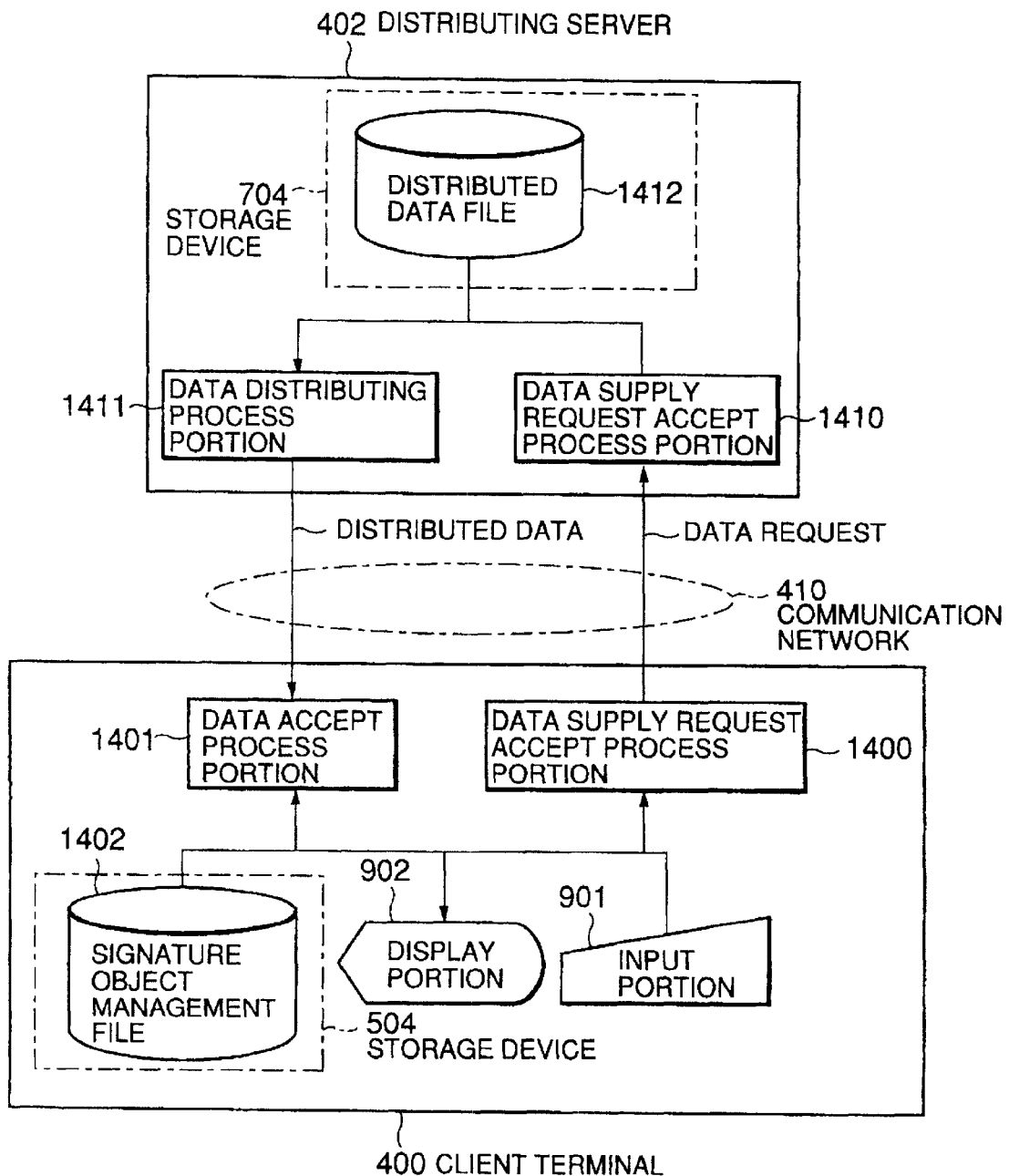
FIG. 8 is a functional block diagram showing a client terminal and a distributing server which are associated with obtaining a client object in the present invention.

FIG. 8 is a functional block diagram showing the client terminal 400 and the distributing server 402 when the client terminal 400 receives a series of distributed data containing the client object program 506*d* from the distributing server 402. Here, each functional block of the client terminal 400 is implemented through the execution of each of the programs stored in the memory 506 by the CPU 505 of the client terminal 400. Further, each functional block of the distributing server 402 is implemented through the execution of each of the programs stored in the memory 506 by the CPU 505 of the distributing server 402.

The functional block construction of the client terminal 400 will now be described.

As shown in FIG. 8, the client terminal 400 includes an input portion 901 for accepting an instruction from the user of the client terminal 400, a display portion 902 for displaying data input to the input portion 901 and data transmitted from the distributing server 403, a data supply request process portion 1400 for making a data request to the distributing server 402 in accordance with the instruction of the user which is input to the input portion 901, and a data reception process portion 1401 for receiving distributed data transmitted from the distributing server 402.

Next, the functional block construction of the distributing server 402 will be described.

As shown in FIG. 8, the distributing server 402 includes a data supply request accept process portion 1410 for accepting a data request from the client terminal 400, and a data distributing process portion 1411 for transmitting a series of distributed data to the client terminal 400 in accordance with the data request concerned.

Figure 10:
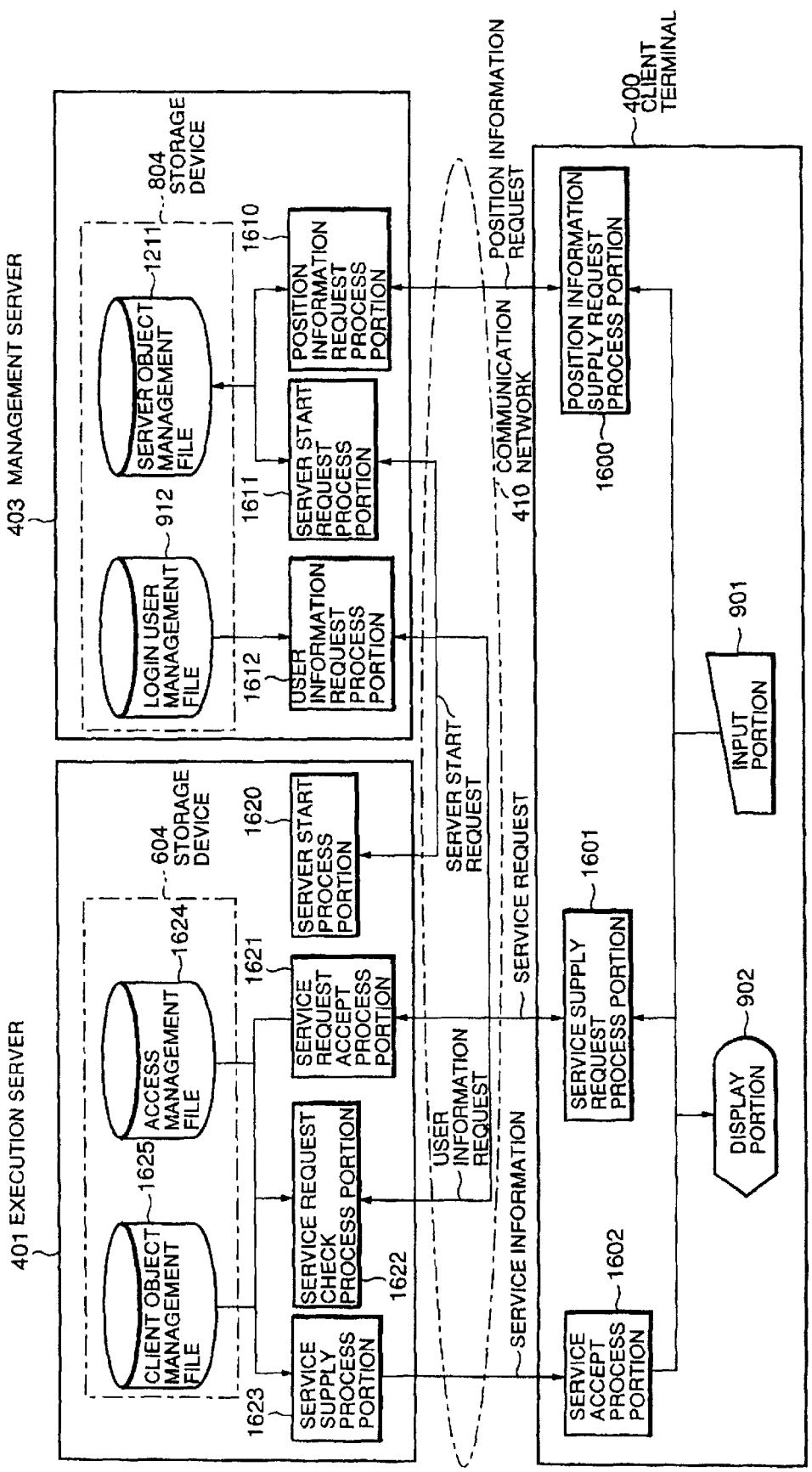
FIG. 10 is a functional block diagram showing a client terminal, an executing server and a management server which are associated with use of services of the user.

FIG. 10 is a functional block diagram showing the client terminal 400, the executing server 401 and the management server 403 when the user of the client terminal 400 uses services supplied from the executing server 401. Here, each functional block of the client terminal 400 is implemented through the execution of each program stored in the memory 506 by the CPU 505 of the client terminal 400. Further, each functional block of the executing server 401 is implemented through the execution of each program stored in the memory 506 by the CPU 505 of the executing server 401. Further, each functional block of the management server 403 is implemented through the execution of each program stored in the memory 506 by the CPU 505 of the management server 403.

The functional block construction of the client terminal 400 will now be described.

As shown in FIG. 10, the client terminal 400 includes an input portion 901 for accepting an instruction of the user of the client terminal 400, a display portion 902 for displaying data input to the input portion 901 and data transmitted from the executing server 401, a position information supply request process portion 1600 for making a position information request to the management server 403, a service supply request process portion 1601 for making a service supply request to the executing server 401, and a service receiving process portion 1602 for performing reception processing of services which are supplied from the executing server 401.

The functional block construction of the management server 403 will now be described.

As shown in FIG. 10, the management server 403 includes a position information request process portion 1610 for searching, in response to the position information request from the client terminal 400, for position information of the executing server 402 in which the server object program 606c is operated, a server start request process portion 1611 for making a request of starting the server object program 606c to the executing server 401, and a user information request process portion 1612 for searching information of the user of the client terminal 400 in response to the user information request from the executing server 401.

The functional block construction of the executing server 401 will now be described.

As shown in FIG. 10, the executing server 401 includes a server starting process portion 1620 for starting the server object program 606c in response to the server starting request from the management server 403, a service request accept process portion 1621 for accepting a service request from the client terminal 400, a service request check process portion 1622 for checking whether the user of the client terminal 400 and the client object program have authority to use the services supplied from the server object program 606c, and a service supply process portion 1623 for supplying the services to the client terminal 400.

A start processing result indicating that the start processing of the server object program 606c is normally completed or that the server object program 606c cannot be normally started due to some cause is notified to the management server 403.

Next, the operation of the distributed object system according to this embodiment will be described.

Figure 12:
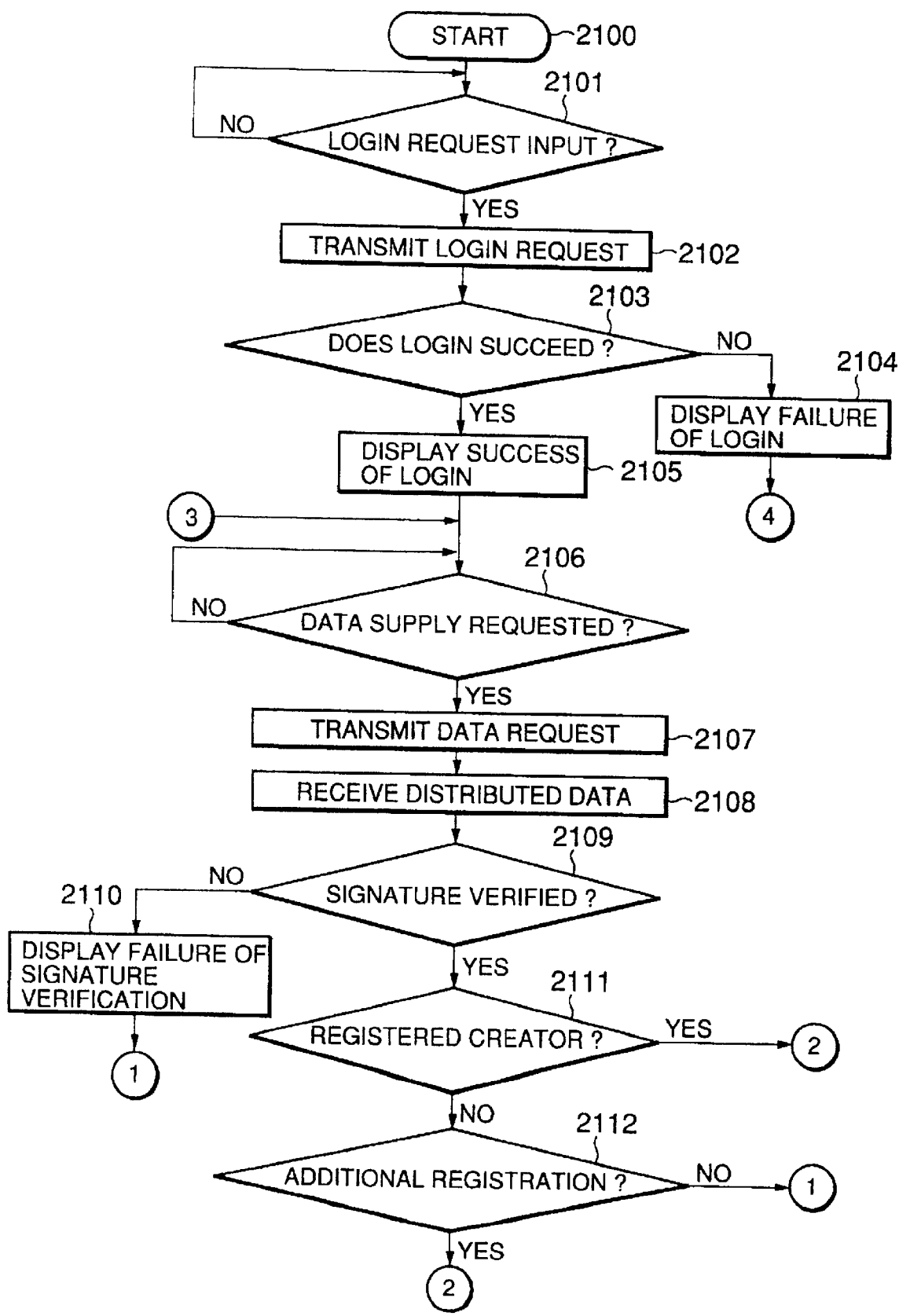
FIG. 12 is a flowchart showing the operation of the client terminal according to the present invention.
Figure 13:
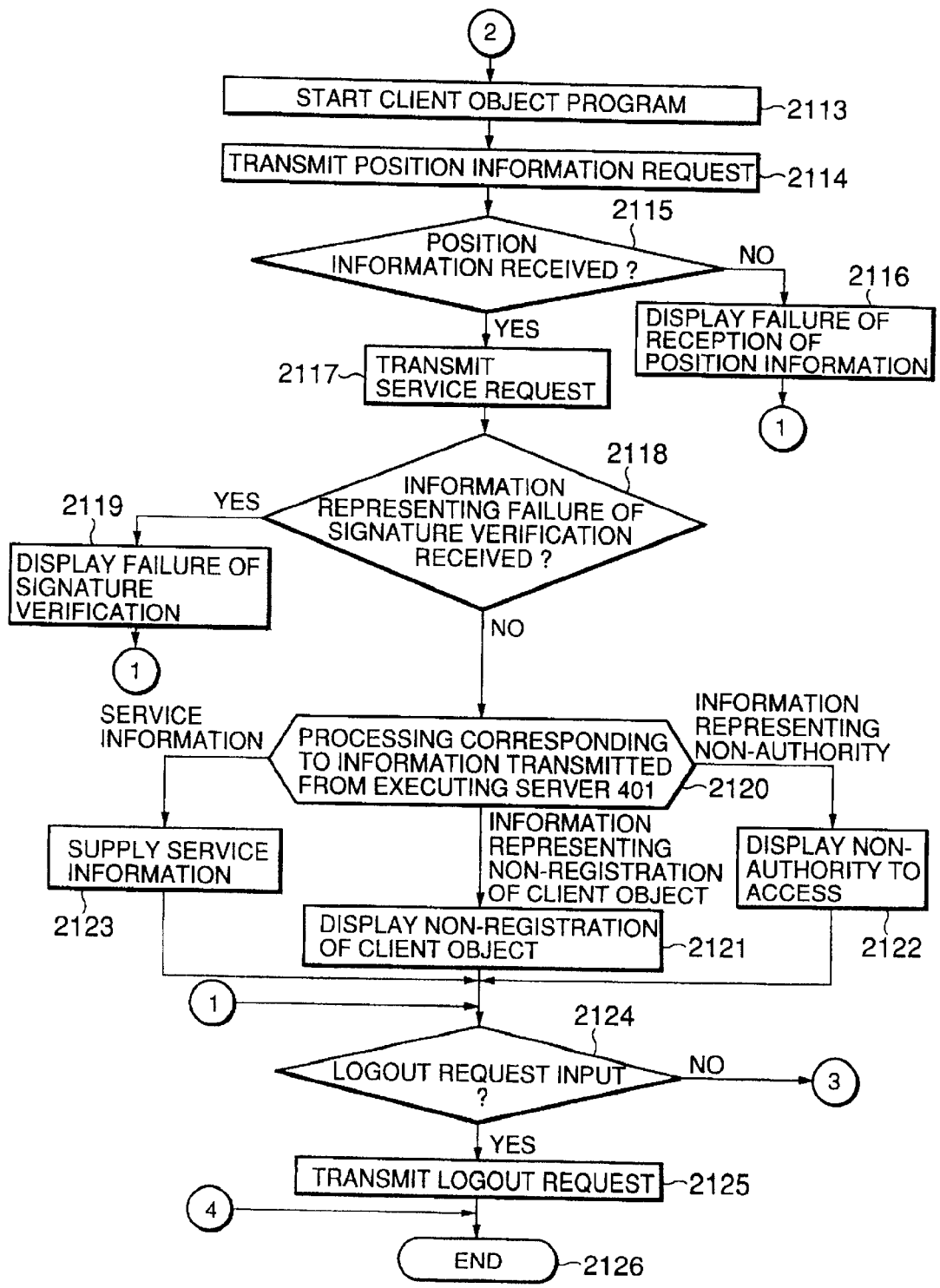
FIG. 13 is a flowchart showing the operation of the client terminal according to the present invention.

FIGS. 12 and 13 are flowcharts showing the operation of the client terminal 400 when the user of the client terminal 400 receives the distributed data from the distributing server 402 and uses the services supplied from the executing server 401 by using the client object program 506d contained in the distributed data. These flowcharts will be described with reference to FIGS. 3, 8 and 10.

When the user of the client terminal 400 inputs a user identifier and a password of the user to the input portion 901 (step 2101), the login request process portion 900 transmits to the management server 403 a login request containing both the user identifier and the password and the position information of the client terminal 400 (step 2102).

The login request process portion 900 receives the login information transmitted from the management server 403 (step 2103). When the login information indicates permission of login, it displays this fact on the display portion 902 (step 2105), and then the processing goes to step 2106.

When the login information indicates non-permission of login, this fact is displayed on the display portion 902 (step 2104), and then this flow is finished. In this case, the user of the client terminal 400 cannot be provided with the services supplied by the executing server 401.

When the user inputs a data request containing the name of distributed data and information indicating a storage place thereof (file name, directory name or the like) from the input portion 901 to instruct down-load of the data in the distributing server 402 (step 2106), the data supply request process portion 1400 transmits the data request to the distributing server 402 (step 2107).

For example, when the data communication is made by using a WWW server program and a Browser program like this embodiment, Uniform Resource Locators (URLs) each comprising a link of the address of the WWW server and the file name are used as information of the name of the distributed data and the storage place thereof.

When receiving the distributed data corresponding to the data request from the distributing server 402 (step 2108), the data reception process portion 1401 verifies the signature of the client object program 506d contained in the distributed data concerned (step 2109).

If the completeness of the client object program 506d (there was no tampering with the original client object program 506d) cannot be verified through the above check operation, this fact is displayed on the display portion 902. Further, the distributed data transmitted from the distributing server 402 is not displayed on the display portion 902, and the client object program executing processing described later is not carried out (step 2110). Thereafter, the processing goes to step 2124.

On the other hand, if the completeness of the client object program 506d can be verified through the above check operation, the signature object management file 1402 (an example thereof is shown in FIG. 9) which is stored in the storage device 504 in advance is searched to check whether the object identifier of the client object program 506d concerned and the name of the creator thereof have been already registered in the file (step 2111), and if they are registered, the processing goes to step 2113.

If they have not been registered in the signature object management file 1402, a choice indicating whether the client object program 506d and the information of the creator should be added to the file concerned or not is displayed on the display portion 902 (step 2112). If the user instructs the addition from the input portion 901, the processing goes to step 2113.

If the user instructs non-addition from the input portion 901, the processing goes to step 2124.

When only the name of a creator can be detected from the above table and when neither the object identifier nor the name of the creator can be detected, it is displayed on the display portion 902 whether the object identifier and the name of the creator are added to a signature object management file 1402 or not, and selected by the user of the client terminal 400.

When the instruction for addition is made from the input portion 901 by the user, a sequence of the object identifier of the client object program 506d and the name of the creator thereof is newly added to the table and a series of distributed data received from the distributing server 402 are displayed on the display portion 902. In addition, client object program executing processing as described later is continually carried out.

Further, when the user inputs such an instruction that addition is not permitted from the input portion 901, no distributed data transmitted from the distributing server 402 is displayed on the display portion 902 and the client object program executing processing described later is not carried out.

When only the object identifier can be detected from the table as the search result, the fact that a client object program having a different creator name, but the same client object program is contained in the distributed data is displayed on the display portion 902, and the client object program executing processing described later is not carried out.

In step 2113, the data reception process portion 1401 displays on the display portion 902 the series of distributed data which are received from the distributing server 402, and starts the client object program 506d to transfer the processing to the position information supply request process portion 1600 (step 2113).

The position information supply request process portion 1600 cooperates with the client object program 506d to transmit the position information request containing the server object identifier of the server object program 606c to the management server 403 (step 2114).

The position information supply request process portion 1600 checks whether the information transmitted from the management server 403 contains position information of the executing server 401 (step 2115). If the position information is not contained, the fact that achievement of the position information failed is displayed on the display portion 902 (step 2116), and the processing goes to step 2124.

If the position information is contained, the service supply request process portion 1601 transmits to the executing server 401 a service request on the services supplied from the server object program 606c while the object identifier of the client object program 506d, the signature of the creator thereof and the position information of the client terminal to the service request are contained in the service request (step 2117).

When the service reception process portion 1602 receives from the executing server the information that the signature verification has failed (step 2118), the fact is displayed on the display portion 902 (step 2119), and the processing goes to step 2124.

When receiving information other than the above information, the service reception process portion 1602 performs the processing corresponding to the information concerned and displays it on the display 902 as occasion demands (step 2120).

Specifically, when the information transmitted from the executing server 401 indicates that the client object program 506d indicated by the service request is not registered in the client object management file 1625 which is stored in the storage device 504 of the executing server 401 in advance, the service reception process portion 1602 displays this fact on the display portion 902 (step 2121), and the processing goes to step 2124.

If the information concerned indicates that the user has no authority to use the services, the service reception process portion 1602 displays this fact on the display portion 902 (step 2122), and the processing goes to step 2124.

If the information concerned is service information which is supplied in accordance with the service request transmitted in step 2117, this service information or the information determined on the basis of the service information is supplied to the user by displaying it on the display portion 902 or the like (step 2123), and the processing goes to step 2124.

When the user inputs a logout request to the input portion 901 (step 2124), the logout request process portion 1900 transmits to the management server 403 a logout request containing the user identifier of the user and the position information of the client terminal 400 which are input to the input portion 901 by the user when the login request processing is carried out (step 2125), and then this flow is finished. If no logout request is input (step 2124), the processing returns to the step 2106.

Figure 14:
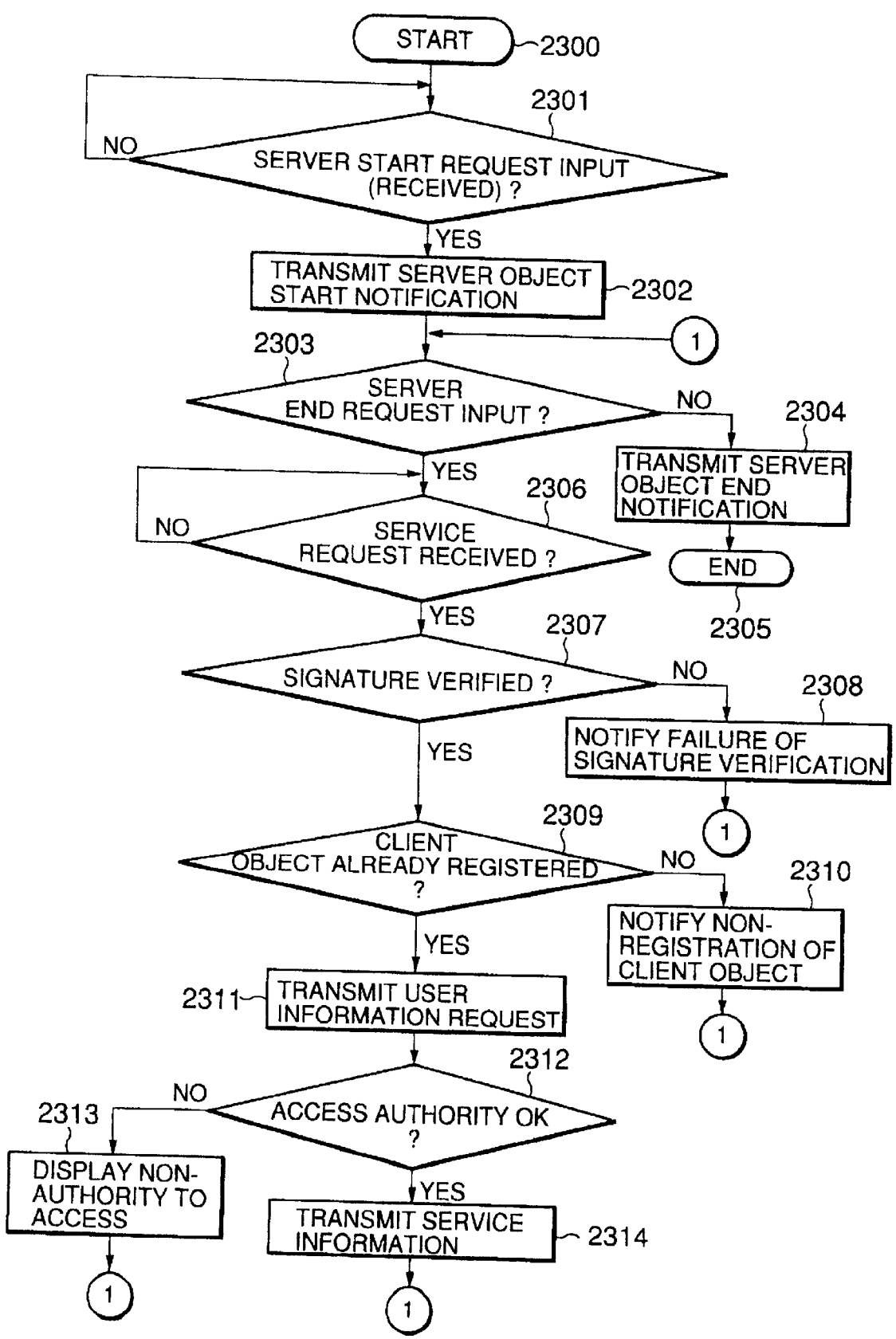
FIG. 14 is a flowchart showing the operation of the executing server according to the present invention.

FIG. 14 is a flowchart showing the operation of the executing server 401 when the services are supplied to the user of the client terminal 400. This flowchart will now be described with reference to FIGS. 6 and 10.

When the manager of the executing server 401 instructs to start the service object program 606c through the input portion 1201 or receives a start request of the service object program 606c concerned from the management server 403 (step 2301), the server object starting process portion 1200 or the server starting process portion 1620 starts the service object program 606c corresponding to the object identifier contained in the start request, and also transmits to the management server 403 a server object start notification containing the object identifier of the service object program 606c and the position information of the executing server 401 (step 2302).

The executing server 401 checks whether the manager instructs to finish the server object program 606c through the input portion 1201 (step 2303).

If the manager instructs to finish the server object program 606c, a server object ending process portion 2000 finishes the server object program 606c indicated, and transmits to the management server 403 a server object end notification containing the object identifier of the service object program 606c and the position information of the executing server 401 (step 2304), and this flow is finished.

The service request accept process portion 1621 accepts the service request transmitted from the client terminal 400 and delivers to the service request check process portion 1622 the object identifier of the client object program 506d, the signature of the creator thereof and the position information of the client terminal 400 which are contained in the service request concerned (step 2306). The service request check process portion 1622 verifies the signature of the creator of the client object program 506d which is received from the service request accept process portion 1621.

If the completeness of the client object program 506d cannot be confirmed through this verification operation, no service is supplied, and the failure of the signature verification is notified to the client terminal 400 (step 2308), and the processing returns to step 2303.

If the completeness of the client object program 506d can be confirmed, the client object management file 1625 (an example of the construction thereof is shown in FIG. 9) which is stored in the storage device 504 in advance is searched, and it is checked whether the client object program 506d concerned and the creator thereof have already been registered in the file (step 2309). If they have been registered, the processing goes to step 2311.

On the other hand, if the client object management file 1625 has not been registered and neither the object identifier nor the name of the creator can be detected from the table, it is notified to the client terminal 400 that the client object has not yet been registered, and no service is supplied (step 2310). Thereafter, the processing returns to step 2303.

If the object identifier and the name of the creator can be detected from the table, the service request check process portion 1622 transmits to the management server 403 a user information request containing the position information of the client terminal 400 which is received from the service request accept process portion 1621 in step 2311.

The user information request process portion 1612 searches for the position information of the client terminal 400 contained in the user information request transmitted from the executing server 401 from the table shown in FIG. 5 stored in advance in the login user management file 912 of the storage device 504.

If the position information of the client terminal 400 can be detected from the table, the user identification and privilege of the user of the client terminal 400 concerned are notified to the executing server 401. When the position information of the client terminal 400 cannot be detected from the table, it is notified to the executing server 401.

Thereafter, when receiving the user identifier of the user of the client terminal 400 and the privilege of the user as a response to the user information request from the management server 403, the service request check process portion 1622 searches the table shown in FIG. 11 which is stored in the access management file 1624 of the storage device 504 in advance to check on the basis of the user identifier and the privilege whether the user concerned has authority to use the services (step 2312).

If the check result indicates that the user of the client terminal 400 has no authority to use the services and thus no service supply is permitted, the service request check process portion 1622 notifies this fact to the client terminal 400 and no service is supplied. The processing returns to step 2303.

If the check result indicates that the user of the client terminal 400 is permitted to be provided with the services, that is, the user has authority to use the services, the service request check process portion 1622 transmits the position information of the client terminal 400 to the service supply process portion 1623 and instructs to provide the services.

The service supply process portion 1623 executes the server object program 606c by using the position information of the client terminal 400. The services such as a service of transmitting the service information corresponding to the service request received in step 2306 to the client terminal 400, etc. are supplied (step 2314). Thereafter, the processing returns to the step 2303.

Figure 15:
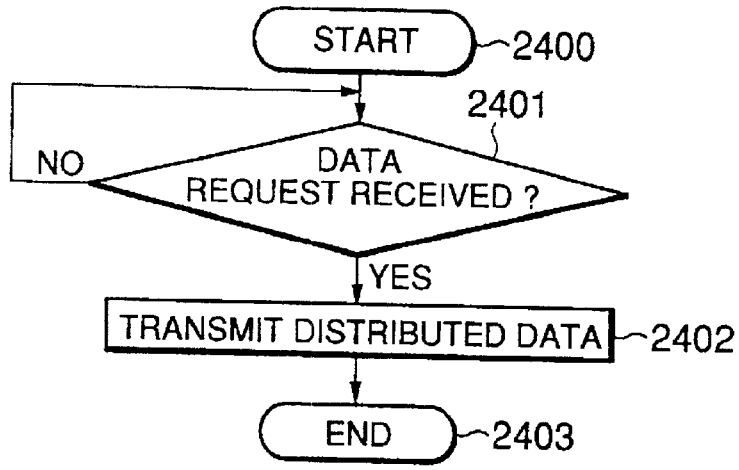
FIG. 15 is a flowchart showing the operation of the distributing server according to the present invention.

FIG. 15 is a flowchart showing the operation of the distributing server 402 when the distributing server 402 provides the user of the client terminal 400 with the distributed data containing the client object program 506d. This flowchart will now be described with reference to FIG. 8.

The data supply request accept process portion 1410 accepts the data request transmitted from the client terminal 400 (step 2401) and delivers to the data distributing process portion 1411 information on the name and storage location of a series of distributed data containing the client object program 506d contained in the data request concerned.

The data distributing process portion 1411 searches the distributed data file 1412 from the information thus received to read out desired distributed data, and transmits the data to the client terminal 400 (step 2402).

In FIG. 15, the starting/ending operation of the distributing server 402 is omitted.

Figure 16:
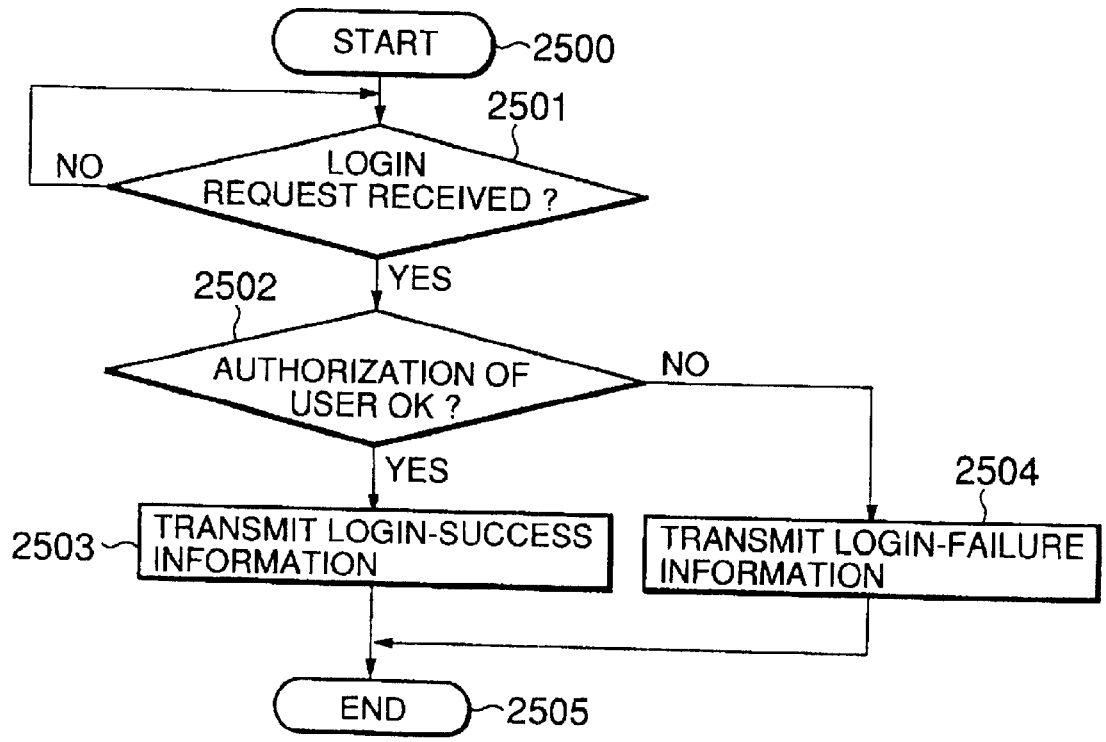
FIG. 16 is a flowchart showing the operation of the management server associated with the login processing of the user according to the present invention.

FIG. 16 is a flowchart showing the operation of the management server 403 when the user of the client terminal 400 logs in. This flowchart will now be described with reference to FIG. 3.

The login process portion 910 accepts the login request transmitted from the client terminal 400 (step 2501), and searches the table as shown in FIG. 4 which is stored in the password management file 911 of the storage device 504 in advance, for the user identifier and the password of the user of the client terminal 400 which are contained in the login request (step 2502).

If the user identifier and the password can be detected from the table, the user identifier concerned and the position information of the client terminal 400 concerned are transmitted to the login user management file 912 to renew the login user management file 912.

In the login user management file 912, there are stored a list of a set of the user identifier, the position information of the client terminal 400 and the privilege of the user concerned. FIG. 5 shows an example of the list stored in the login management file 912.

It is notified to the client terminal 400 that the login has been performed normally (step 2503).

On the other hand, if the user identifier and the password cannot be detected from the table, it is notified to the client terminal 400 that the login cannot be performed (step 2504), and then this flow is finished.

Next, the operation of the management server 403 when the user of the client terminal 400 logs out will be described.

Figure 17:
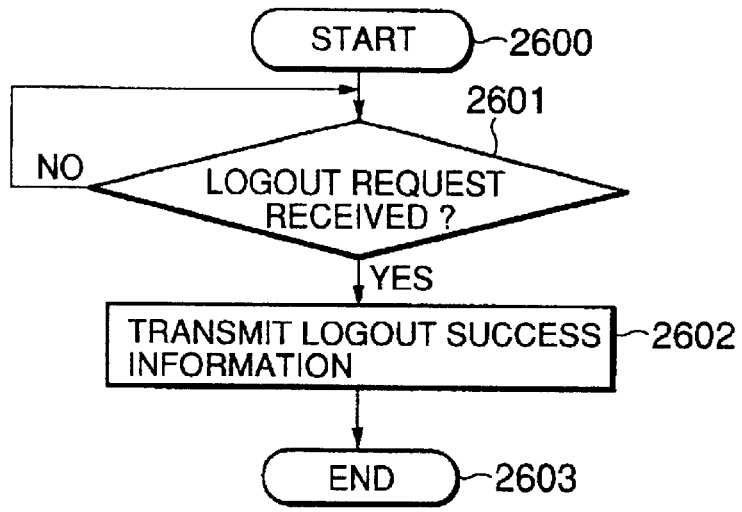
FIG. 17 is a flowchart showing the operation of the management server associated with the logout processing of the user according to the present invention.

FIG. 17 is a flowchart showing the operation of the management server 403 when the user of the client terminal 400 logs out.

When the management server 403 accepts the logout request from the user of the client terminal 400 (step 2601), the logout process portion 1910 deletes the user identifier and the position information of the client terminal 400 contained in the logout request, and the privilege set with the user identifier and the position information from the table as shown in FIG. 5 which is stored in the login user management file 912 of the storage device 504 in advance. In addition, the information that the logout has succeeded is transmitted to the client terminal 400 (step 2602) and then this flow is finished.

Figure 18:
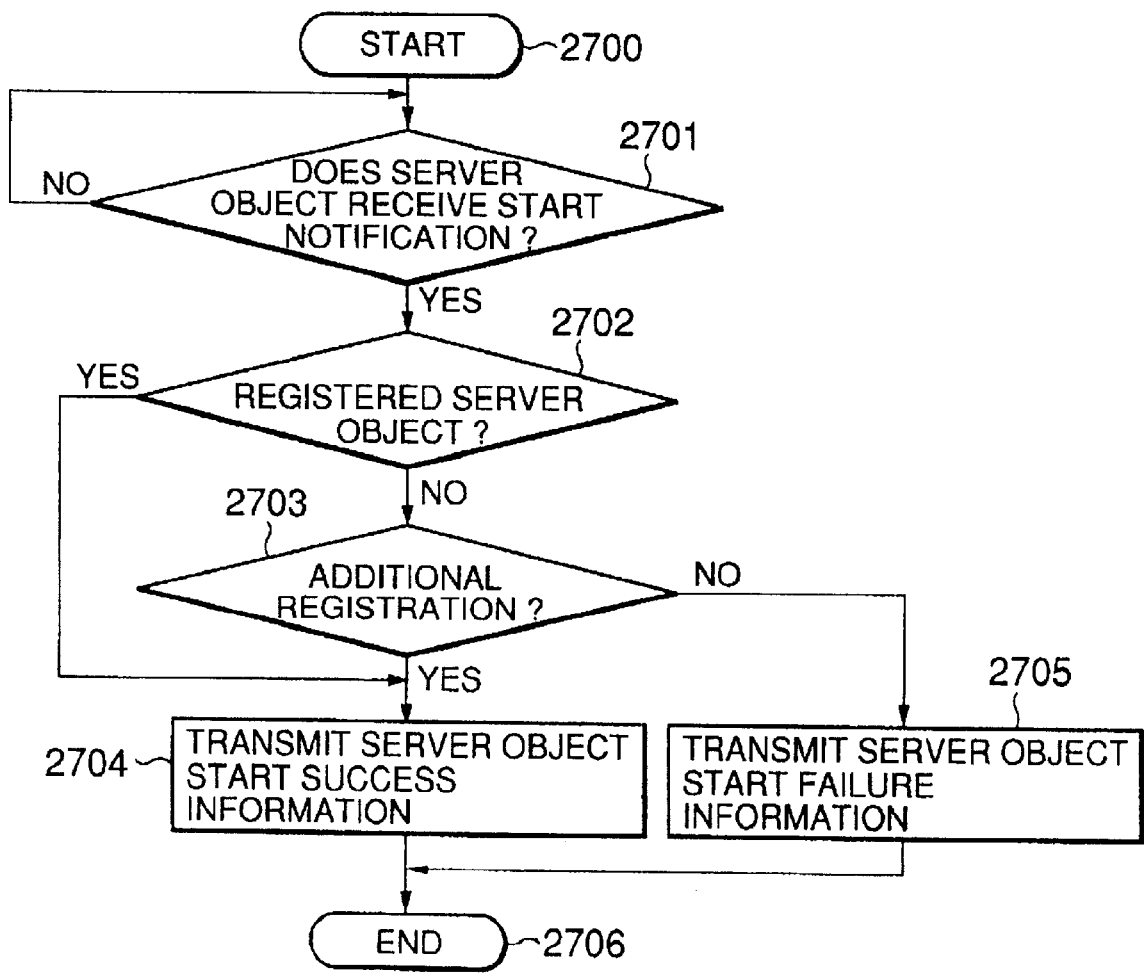
FIG. 18 is a flowchart showing the operation of the management user associated with the start processing of the server object program according to the present invention.

FIG. 18 is a flowchart showing the operation of the management server 403 when the manager of the executing server 401 starts the service object program 606c. This flowchart will now be described with reference to FIG. 6.

When the management server 403 receives the server object start notification from the server object start process portion 1200 of the executing server 401 (step 2701), the server object management process portion 1210 searches the table as shown in FIG. 7 which is stored in the server object management file 1211 of the storage device 504 in advance, for the object identifier of the server object program 606c and the position information of the executing server 401 (step 2702).

If the object identifier of the server object program 606c has been registered in the table in the above search operation, the processing goes to step 2704.

If either the object identifier of the server object program 606c or the position information of the executing server 401 has not been registered in the table, the server object management process portion 1210 judges it according to a predetermined operation manual of the distributed object system of this embodiment whether the object identifier and the position information can be added to the table (step 2703). If a dynamic addition of the server object is permitted, the sequence comprising the object identifier contained in the server object start notification transmitted from the executing server 401 and the position information of the executing server 401 is newly added, and then the processing goes to step 2704.

Further, when the dynamic addition of the server object is not permitted, it is notified to the executing server 401 that the server object starting processing cannot be normally finished due to the non-permission of the dynamic addition of the server object (step 2705), and then this flow is finished.

The server object management process portion 1210 searches the object identifier of the server object program 606c contained the server object end notification and the position information of the executing server 401 from the table as shown in FIG. 7 which is stored in the server object management file 1211 of the storage device 504 in advance, and renews "starting state" to "non-start".

In step 2704, the position information of the executing server 401 corresponding to the object identifier concerned which is contained in the table is compared with the position information transmitted from the executing server 401.

If the comparison result indicates coincidence in position information, "starting state" of the table is renewed to "start". Further, if the comparison results indicates non-coincidence in position information (i.e., they are different from each other), the "position information" of the table concerned is renewed to the position information transmitted from the executing server 401, and then "starting state" is renewed to "start". Thereafter, it is notified to the executing server 401 that the start processing of the server object finished normally (step 2704), and then this flow is finished.

FIG. 19 is a flowchart showing the operation of the management server 403 when the manager of the executing server 401 finishes the server object program 606c. This flowchart will now be described with reference to FIG. 6.

When the management server 403 receives a server object end notification from the server object end process portion 2000 (step 2801) of the executing server 401, the server object management process portion 1210 searches the object identifier of the server object program 606c and the position information of the executing server 401 which are contained in the server object end notification, from the table as shown in FIG. 7 which is stored in the server object management file 1211 of the storage device 504 in advance, and renews "start state" of the sequence to "nonstart". In addition, it transmits to the executing server 401 information representing that the processing in the management server 403 on the end of the server object program 606c has finished normally (step 2802), and then this flow is finished.

FIG. 20 is a flowchart showing the operation of the management server 403 when an inquiry about the position information of the executing server 401 is made from the client terminal 400. This flowchart will now be described with reference to FIG. 10.

When the management server 403 receives the position information request from the client terminal 400 (step 2901), the position information request process portion 1610 searches for the object identifier of the server object program 606c contained in the position information request concerned from the table as shown in FIG. 7 which is stored in the server object management file 1211 of the storage device 504 in advance (step 2902).

When no object identifier can be detected from the table, it is notified to the client terminal 400 that the server object program 606c indicated has not yet been registered (step 2903), and then this flow is finished.

When the object identifier can be detected from the table, it is checked by referring to the corresponding sequence of the table whether the server object program 606c has been started (step 2904). If the server object program 606c has been started, the processing goes to step 2908.

If the server object program 606c is judged not to be started in the start check operation of step 2904, the object identifier of the server object program 606c and the position information of the executing server 401 are delivered to the server start request process portion 1611. The server start request process portion 1611 transmits the server start request containing the object identifier and the position information to the executing server 401 (step 2905).

Thereafter, when receiving from the executing server 401 such a notification that the server object program 606c is normally started (step 2906), the server start request process portion 1611 renews "start state" to "start" for the sequence containing the object identifier of the server object program 606c of the table shown in FIG. 7, and also transmit it to the position information request process portion 1610, thereafter the processing going to step 2908.

When receiving from the executing server 401 such a notification that the server object program 606c cannot be normally started (step 2906), the server start request process portion 1611 and the position information request process portion 1610 notifies the client terminal 400 of the fact that the server object program 606c indicated cannot be started (step 2907), and then this flow is finished.

In step 2908, the position information of the executing server 401 in which the server object program 606c operates is notified to the client terminal 400, and then this flow is finished.

The present invention is not limited to the above embodiment, and various modifications may be made.

For example, in this embodiment, the user is required to input a user identification and a password in order to perform the login processing, however, the present invention is not limited to this manner. Instead of the password, the login operation may be performed by using a biological feature such as a fingerprint or the like.

That is, it may be adopted that a table in which a user identifier and a biological feature such as a fingerprint or the like are associated with each other is stored beforehand in the password management file 911, and the association between the user identifier and the biological feature such as a fingerprint or the like is checked on the basis of the table to perform the login processing. The biological feature such as the fingerprint or the like may be read out by a scanner, for example.

Further, it may be adopted that some password conversion program (for example, an enciphering program, a one-way hash program or the like) is commonly provided to the client terminal 400 and the management server 403, results obtained by subjecting passwords to the conversion program are stored beforehand in the password management file 911 and the login processing is carried out by using the conversion result.

Further, according to this embodiment, the server object program 606c supplies only one service. Accordingly, in this embodiment, the user of the client terminal 400 makes a position information request or a service request by using only the object identifier of the server object program 606c.

However, the present invention is not limited to this manner. That is, a service identifier may be allocated for every service type which is supplied from each server object program. In this case, when the user of the client terminal 400 makes a position information request or a service request, a service identifier of a desired service in plural services to be supplied from the server object program 606c may be contained in the position information and the service request.

In the above modification, each sequence of the table shown in FIG. 7 which is stored in the server object management file 1211 of the storage device 504 of the management server 403 is further sectioned for every service identifier. Further, a table as shown in FIG. 11 which is stored in the access management file 1624 of the storage device 504 of the executing server 401 is likewise sectioned.

With this sectioning, a server object program can provide many services.

Further, in this embodiment, no special means is provided for maintaining the secrecy and completeness of information which is communicated among the client terminal 400, the executing server 401, the distributing server 402 and the management server 403 through a communication network 410, but the present invention may be applied in combination with various enciphering means and authentication means. In this embodiment, by applying the enciphering means or the authentication means to information flowing in a communication network, the safety of the overall system can be further enhanced.

The above embodiment is not provided with any means of gaining and holding logs for all the processing associated with the client terminal 400, the executing server 401, the distributing server 402 and the management server 403. However, the present invention may be applied in combination with such means. Log gaining/holding means may be provided to each of the client terminal 400, the executing server 401, the distributing server 402 and the management server 403 to further enhance the safety of the overall system.

Further, in this embodiment, the executing server 401, the distributing server 402 and the management server 403 are respectively constructed on separate computer devices, but they may be collectively constructed on one computer.

That is, each server may be a program module such as a process portion task which operates on a computer. In this case, the check of the signature affixed to the object program and the execution management thereof are performed on a module basis. In this case, the respective programs shown in FIG. 2B to FIG. 2E are stored on the same computer, and executed as different program modules.

Still further, in this embodiment, the table showing the corresponding relationship between the object identifier of the client object program 506d and the creator thereof is managed by the executing server 401, but the present invention is not limited to this manner. The table may be managed by the management server 403 and the executing server 401 may inquire to the management server 403, whereby the tables can be made common among all the executing servers to facilitate collective management of the tables in such a system that there are plural executing servers 401.

In addition, in this embodiment, provision of an electronic signature to the client object program 506d is performed by the creator of the client object program 506d concerned, but the present invention is not limited to this manner. Instead of the electronic signature of the creator, the electronic signature of any manager of the distributed object system of this embodiment, or the electronic signature of a third party institute (authentication institute) which are relied on by all the people involved in the distributed object system of this embodiment (the user of the client terminal 400, the manager of the executing server 401, the manager of the management server, etc.) may be used. Further, when these managers or the authentication institute provides an electronic signature to the client object program 506d, it may be checked before the provision of the signature whether the client object program 506d carries out unjustified processing. In this case, only when it is checked that the client object program is normal, is the signature provided to the client object program 506d, whereby an unjustified client object program can be excluded in advance and the safety of the overall system can be further enhanced.

As described above, according to the present invention, it is possible to prevent the case where a client object program which is down-loaded to the client terminal through a network and then executed therein using the authority of a user using a client terminal, performs unjustified processing which is not intended by the user.

What is claimed is:

1. A distributed object system comprising:

at least one object distributing server including object storage means for storing therein object programs affixed with electronic signatures, and object delivery means for receiving a delivery request of the object program from a client terminal and transmitting the object program to the client terminal;

at least one distributed object system management server including a first management table for representing the corresponding relationship between identification information of a user using the client terminal and attribute information of the user, a second management table for representing the corresponding relationship between identification information of the user and the position information of the client terminal which the user uses, and user information notifying means for notifying to a server object execution server the identification information of the user corresponding to the position information of said client terminal contained in the user information request from the server object execution server by referring to said second management table;

at least one client terminal including a third management table for representing the corresponding relationship between the object program which is permitted to be started at said client terminal by the user and a signatory of the electronic signature affixed to the object program, first signature verifying means for verifying the electronic signature affixed to the object program when the object program is received from said object distributing server, start judgment means for judging by referring to said third management table whether the object program is started or not when the completeness of the object program is confirmed, and object start means for starting the object program when the object program is judged to be started; and at least one server object execution server including a fourth management table for representing the corresponding relationship between the object program to which use of services to be supplied from said server object execution server is permitted and a signatory of an electronic signature affixed to the object program concerned, a fifth management table for representing the corresponding relationship of identification information of the user to which use of at least one service to be supplied from said server object execution server is permitted, attribute information of the user determined by the identification information of the user, and the server object program which implements the service, second signature verifying means for verifying the electronic signature affixed to the object program contained in a service request received from said client terminal, first service supply judgment means for judging, by referring to said fourth table, whether the service is supplied to said client terminal when the completeness of the object program is confirmed, second service supply judgment means for receiving the identification information of the user and the attribution information of the user from said distributed object system management server when a first service supply condition corresponding to said fourth management table is satisfied, and judging, by referring to said fifth management table, whether the service is supplied to said client terminal, and service supply means for executing the processing corresponding to the service request when a second service supply condition corresponding to said fifth management table is satisfied and supplying the service information to said client terminal.

2. The distributed object system as claimed in claim 1, wherein said start judgment means of said client terminal further includes user instruction judgment means for renewing said third management table when the user of said client terminal instructs to start the object program concerned.

3. The distributed object system as claimed in claim 2, wherein said distributed object system management server further includes:
   a sixth management table for representing the corresponding relationship between a server object program operating in said server object execution server and said server object execution server;
   server object management means for renewing said sixth management table in accordance with a server object start notification or a server object end notification received from said server object execution server; and
   position information supply means for referring to said sixth management table in response to a position information request of said server object execution server received from said client terminal to notify the position information concerned to said client terminal, and wherein said client terminal further includes position information request processing means for inquiring the position information of said server object execution server to said distributed object system management server.

4. The distributed object system as claimed in claim 3, wherein said distributed object system management server further includes server start request means for transmitting a server start request to said server object execution server, and said server object execution server further includes server object start processing means for starting a server object program which is indicated by the server start request received from said distributed object system management server.

5. The distributed object system as claimed in claim 4, wherein said client terminal further includes first history holding means for storing the history of processing in which said client terminal is involved, said server object execution server further includes second history holding means for storing the history of processing in which said server object execution server is involved, said object distributing server further includes third history holding means for storing the history of processing in which said object distributing server is involved, and said distributing object system management server further includes fourth history holding means for storing the history of processing in which said distributed object system management server is involved.

6. The distributed object system as claimed in claim 5, wherein said electronic signature is an electronic signature of the creator of the object program concerned.

7. The distributed object system as claimed in claim 5, wherein said electronic signature is an electronic signature of the manager of the distributed object system concerned.

8. The distributed object system as claimed in claim 5, wherein said electronic signature is an electronic signature of a third party institute relied on by people involved in said distributed object system.

9. The distributed object system as claimed in claim 8, wherein the signatory provides said electronic signature to said object program when the operation of said object program is confirmed, the operation of the object program concerned is coincident with an operation indicated by the creator of the object program concerned and the user of said client terminal is permitted to use the object program concerned.

10. A distributed object system comprising:
   at least one object distributing server including object distributing means for transmitting an electronically-signed object program to a client terminal in accordance with a transmission request of the object program received from a client terminal;
   at least a client terminal including the first signature verifying means for verifying the electronic signature affixed the object program when the object program is received, start judgment means for judging verification, the basis of the corresponding relationship between the object program and the signatory of the electronic signature affixed to the object program, whether or not the object program is started at said client terminal when the completeness of said object program is confirmed, and object starting means for starting the object program when the object program is judged to be started;
   at least one management server including a management table for representing the corresponding relationship between the identification of the user and the position information of said client terminal, and user information notifying means for notifying to an object executing server the identification information of the user corresponding to the position information of said client terminal contained in a user information request from an object executing server by referring to said management table; and
   at least one object executing server including the second signature verifying means for verifying the electronic signature affixed to the object program contained in a service request received from said client terminal, and the first service supply judgment means for judging, on the basis of the corresponding relationship between an object program to which use of services is permitted and the signatory of an electronic signature affixed to the object program, whether the services to be supplied from said object executing server are supplied to the object program received, means for requesting the identification information of the user of said client terminal to said management server, second service supply judgment means for judging, on the basis of the corresponding relationship between the identification information of a user to which use of services is permitted and the server object program implementing the services, whether the services should be supplied to the user who requesting the services, and service supply means for executing the processing corresponding to the service request when the service supply condition is satisfied, and supplying service information to said client terminal.

* * * * *